United States Patent

Mrdjenovich

[11] Patent Number: 5,826,373
[45] Date of Patent: Oct. 27, 1998

[54] ARTIFICIAL LANDSCAPING BOULDERS

[76] Inventor: Frances D. Mrdjenovich, 4745 Roundtree Dr., Garden City, Mich. 48116

[21] Appl. No.: 815,548

[22] Filed: Feb. 18, 1997

[51] Int. Cl.⁶ .................................................. A01G 1/08
[52] U.S. Cl. ................................................................ 47/33
[58] Field of Search ................................. 47/33, 58, 66.1, 47/66.2, 66.3, 66.4, 66.5, 66.6, 66.7; 119/61, 253, 256, 246, 221; D6/556; D11/143, 144, 152, 153, 154

[56] References Cited

U.S. PATENT DOCUMENTS

| | | | |
|---|---|---|---|
| 2,670,571 | 3/1954 | Waldron | 47/33 X |
| 3,269,578 | 8/1966 | Lewis | 119/246 X |
| 3,455,280 | 7/1969 | Keene | 119/61 |
| 3,991,719 | 11/1976 | Bruce | 119/61 |
| 4,197,684 | 4/1980 | Johnson | 47/33 X |
| 4,318,945 | 3/1982 | Goldman et al. | 119/256 |
| 4,487,164 | 12/1984 | Yanagisawa | 119/51.5 |
| 4,691,664 | 9/1987 | Crowell | 119/61 |
| 4,708,089 | 11/1987 | Goldman et al. | 119/256 X |
| 5,353,546 | 10/1994 | Bock | 47/66.6 |
| 5,660,374 | 8/1997 | Dayberry | 47/33 X |

*Primary Examiner*—Michael J. Carone
*Assistant Examiner*—Yvonne R. Abbott

[57] ABSTRACT

A product is hereby disclosed for landscaping using artificial boulders which simulate the appearance of natural boulders each comprising a hollow enclosure formed by upper and lower sections, wherein the upper and lower sections cooperate with one another to provide a friction fit, and wherein the boulders each include an integrally molded planting pocket extending inwardly from the exterior of the upper section and having a removable plug to allow for drainage of water.

The boulders can be made in a variety of shapes and colors from linear or cross-linked polymers that are resistant to degradation from sunlight and extremes in outside temperatures, or from ceramic materials, or from polymeric and ceramic materials. The product can be made with polymer or ceramic shaping processes. Surfaces can be laminated or coated with polymeric or ceramic materials during processing to further simulate the appearance of natural rock boulders.

1 Claim, 3 Drawing Sheets

ARTIFICIAL LANDSCAPING BOULDERS

BACKGROUND OF THE INVENTION

1. Field of the Invention

The present invention relates generally to artificial landscaping boulders that are lightweight and comprise of a wall forming an enclosure with a hollow interior and a deep dish planting pocket that extends into retaining soil that is also used for growing plants, along with a knock-out plug to allow for drainage of water.

2. Description of Related Art Statement

Conventional landscaping utilizes large, heavy natural rock boulders that are not only expensive, but also difficult to use. These boulders are typically obtained by blasting or mining in quarries which results in degradation of the natural environment. Large earth moving or material handling machines are required to transport and install these boulders in the landscaping process with risk of damaging existing landscaped areas or lawns, sidewalks, and driveways.

SUMMARY OF THE INVENTION

It is an object of the present invention to provide an artificial landscaping boulder which simulates the appearance of a natural boulder comprising a hollow enclosure formed by upper and lower sections, wherein the upper and lower sections cooperate with one another to provide a friction fit, and wherein the boulder includes an integrally molded planting pocket extending inwardly from the exterior of the upper section and having a removable plug to allow for drainage of water. Soil can be added through the integral pocket to both retain the boulder in place, and function as the media for growing plants.

It is another object of the present invention to provide artificial boulders in a variety of shapes and colors that are unique to the various regions of North America, and the rest of the world, e.g. Colorado boulders, Grand Teton boulders, Utah Red-Rock boulders, Canadian Rockies boulders, etc.)

It is another object of the present invention to allow the use of the retaining solid as a planting media for flowers or plants. To achieve the forgoing objects, the present invention provides hollow, lightweight landscaping boulders that have filling and drainage receptacles. Wall thickness is approximately 2–4 mm or that required to provide sufficient structural stiffness while remaining lightweight for ease of handling.

Advantages of the present invention are that these artificial boulders will be (1) more affordable and available to the public compared to natural boulders, (2) easily transported and used in gardening or landscaping processes, and (3) enhance conservation of natural resources and beauty while utilizing a portion of recycled materials.

Other objects, features, and advantages of the present invention will be readily appreciated as the same becomes better understood after reading the subsequent description taken in conjunction with the accompanying drawings.

In summary, the overall result of the teachings of this invention is the artificial landscaping boulder which simulates the appearance of a natural boulder comprising a hollow enclosure formed by upper and lower sections, wherein the upper and lower sections cooperate with one another to provide a friction fit, and wherein the boulder includes an integrally molded planting pocket extending inwardly from the exterior of the upper section and having a removable plug to allow for drainage of water. Soil can be added through the integral pocket to both retain the boulder in place, and function as the media for growing plants.

Artificial landscaping boulders will be affordable to the general public and make it possible to easily create unique rock or pond gardens, or borders with planting features for enjoyable gardening. These products are lightweight and can be manually transported and arranged.

BRIEF DESCRIPTION OF THE DRAWINGS

FIG. 1 shows an ellipsoidal, or "Colorado" boulder.

DETAILED DESCRIPTION OF PREFERRED EMBODIMENTS

Figure 1:
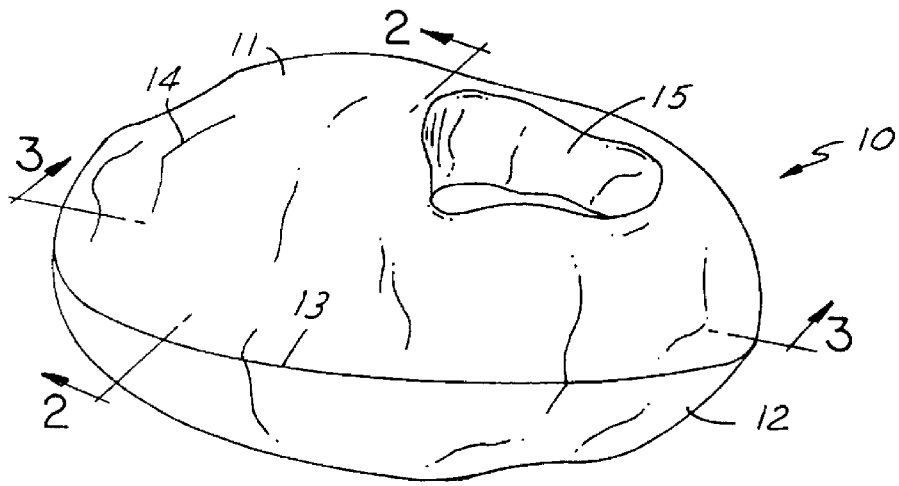
FIG. 1 is a perspective view of an artificial landscaping boulder which simulates the appearance of a natural boulder comprising a hollow enclosure formed by upper and lower sections, wherein the upper and lower sections cooperate with one another to provide a friction fit, and wherein the boulder includes an integrally molded planting pocket extending inwardly from the exterior of the upper section and having a removable plug to allow for drainage of water with molded-in planting pocket illustrating the present invention. Top and bottom sections have been joined. This artificial landscaping boulder can also be made in a variety of sizes and shapes.

With reference to FIG. 1 of the drawings, there is depicted an artificial landscaping boulder 10 having two sections 11, 12 joined together at a joint face 13 with slight irregular depressions 14 on the surfaces to simulate a natural boulder surface. The boulder 10 includes an integrally molded planting pocket 15 extending inwardly from the exterior of the top section 11. The pocket is molded-in place using an insert in the top die or mold cavity, or with a retractable die or mold insert depending on the location of the pocket on the top surface which will influence the angle of retraction. The boulder is ellipsoidal in shape and is made from polymeric or ceramic materials, or a combination of both. This figure shows the ellipsoidal shape typical of "Colorado Boulders." Other embodiments such as spherical shapes typical of "Utah Red-Rock" boulders, or trapezoidal shapes typical of "Canadian Rockies" boulders can also be depicted with like descriptions and reference numerals.

Figure 2:
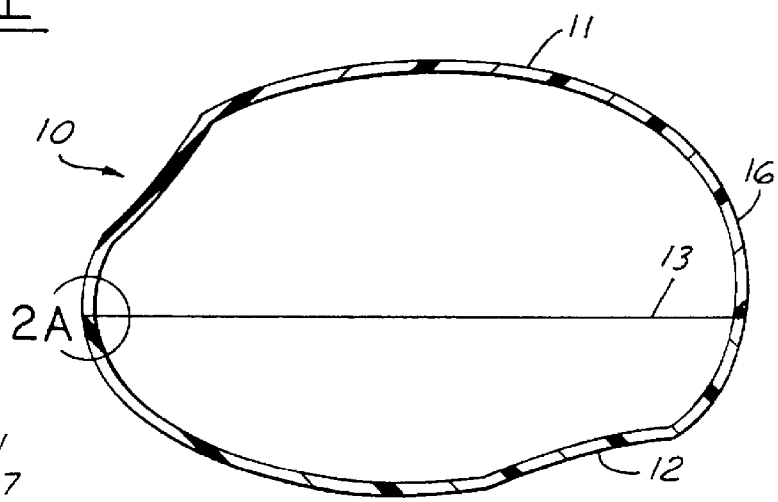
FIG. 2 is a longitudinal sectional view along Section 2—2 of FIG. 1 of an artificial landscaping boulder illustrating the present invention and showing said sections and hollow nature of the boulder with a thin but structurally stiff wall, and the joint face where the two sections are joined.
Figure 2A:
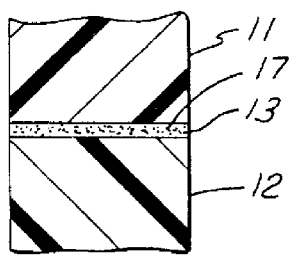
Figure 3:
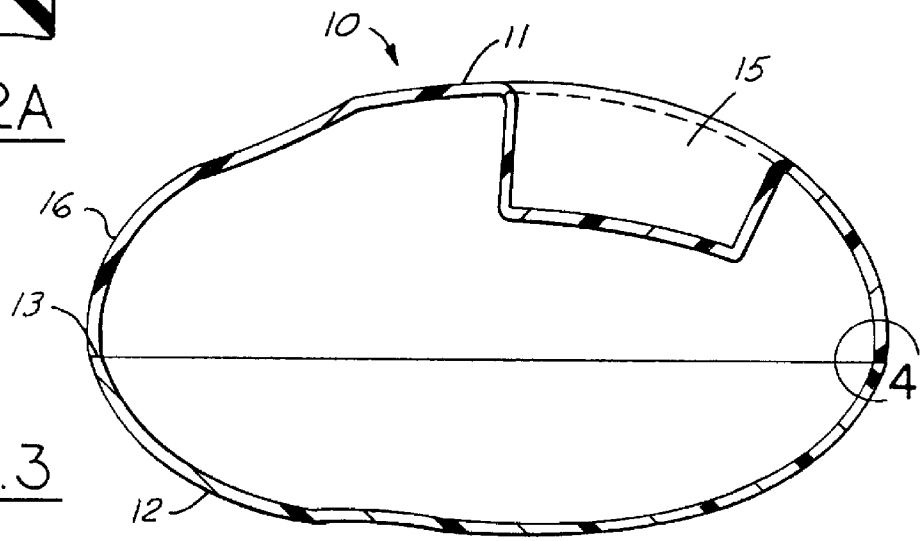
Figure 4:
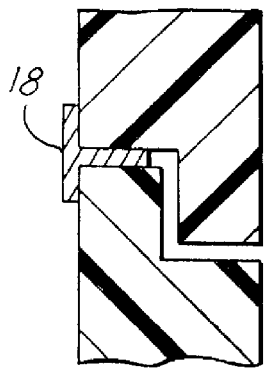
Figure 5:
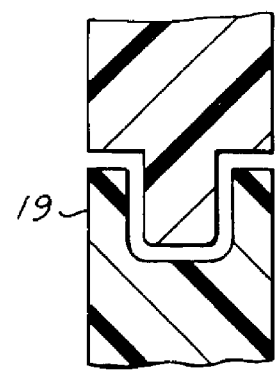
Figure 6:
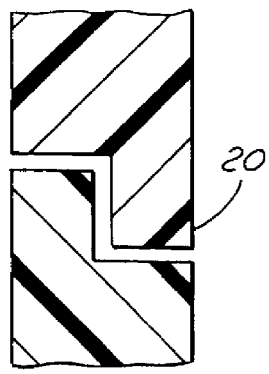
Figure 7:
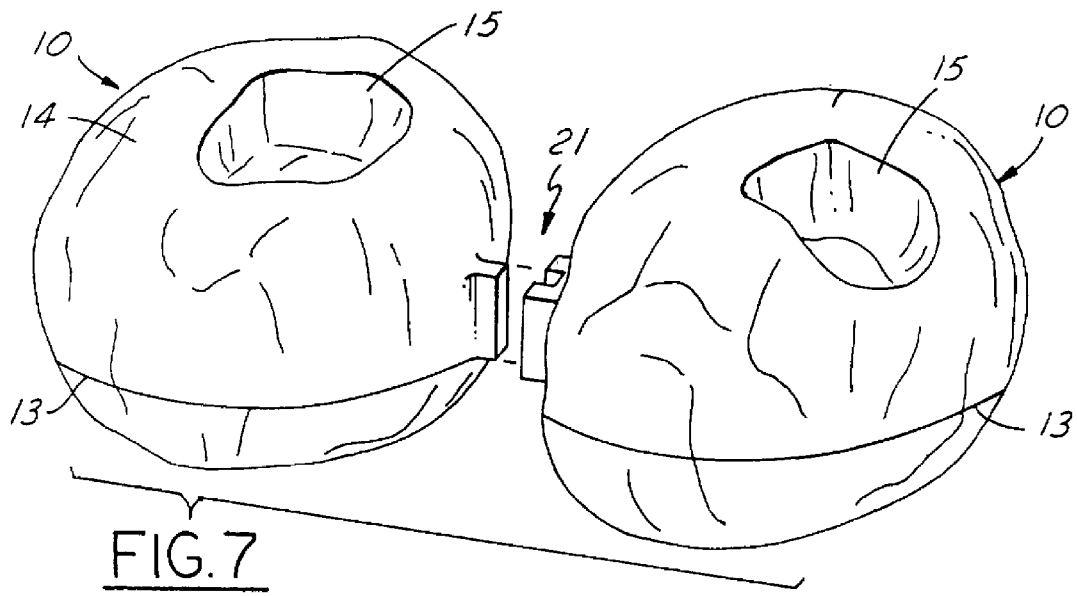
Figure 8:
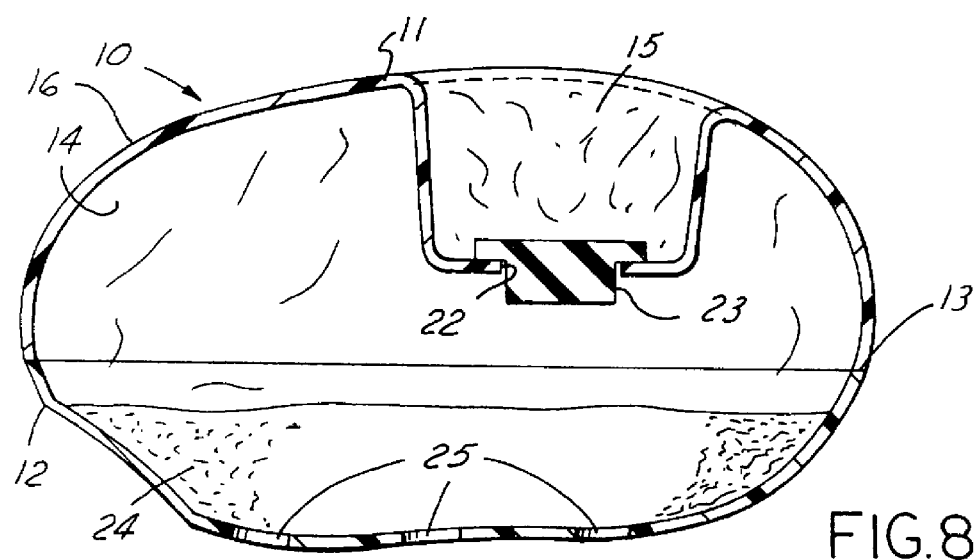
Figure 9:
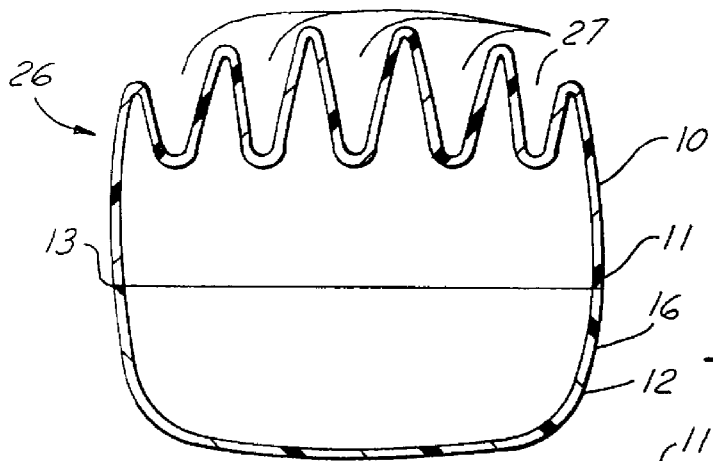

The hollow nature of the artificial landscaping boulders 10 of the present invention taken along Section 2—2 of FIG. 1 is shown in FIG. 2 with each section 11, 12 having wall 16 thickness equivalent to that required for structural stiffness such as 2–4 mm or an equivalent thereof.

Figure 10:
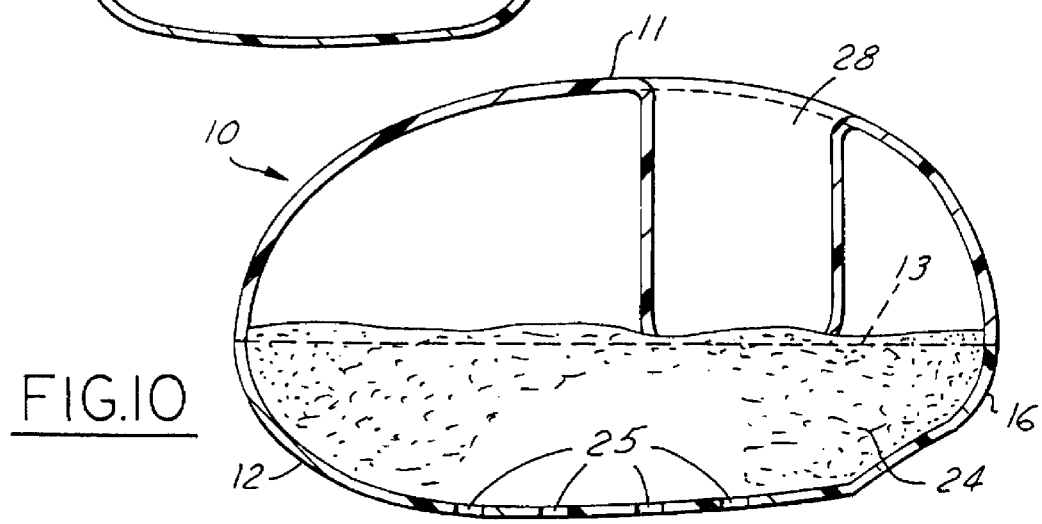
FIG. 10 is a sectional view along Section 3—3 of FIG. 1 of a two piece artificial landscaping boulder with "deep dish" planting pocket in which the retaining soil is used as the planting media and the base of the boulder has knock-out plugs for water drainage.
Figure 11:
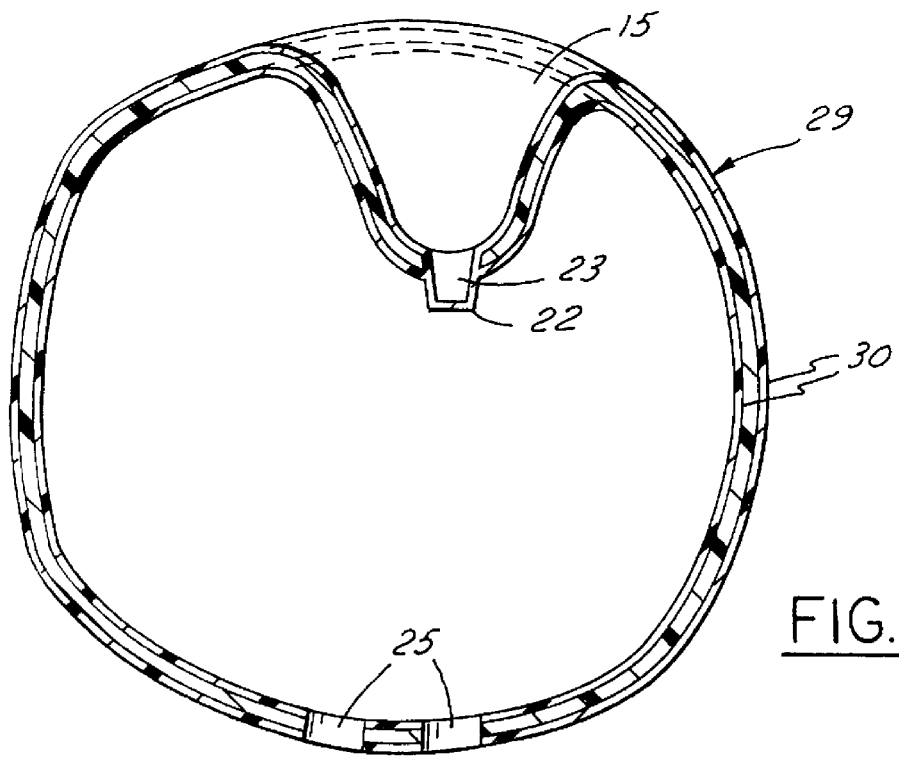

With reference to FIG. 10 of the drawings, there is depicted an artificial landscaping boulder 10 having two sections 11, 12 jointed together at a joint face 13 with slight irregular depressions 14 on the surfaces to simulate a natural boulder surface. The boulder 10 includes a a deep dish planting pocket 28 in the top section 11 that extends directly into the retaining media 24 which in this case is soil located in the bottom section 12. The joint face 13 of the hollow boulder 16 is also shown for reference. Knock out plugs 25 are used to allow for drainage of water.

Other embodiments such as spherical shapes typical of "Utah Red-Rock" boulders, or trapezoidal shapes typical of "Canadian Rockies" boulders can also be depicted with like descriptions and reference numerals.

The hollow nature of the artificial landscaping boulders 10 of the present invention taken along Section 2—2 of FIG. 1 is shown in FIG. 2 with each section 11, 12 having wall 16 thickness equivalent to that required for structural stiffness such as 2–4 mm or an equivalent thereof.

With reference to FIG. 10 of the drawings, there is depicted an artificial landscaping boulder 10 having two sections 11, 12 joined together at a joint face 13 with slight irregular depressions 14 on the surfaces to simulate a natural boulder surface. The boulder 10 includes a a deep dish planting pocket 28 in the top section 11 that extends directly into the retaining media 24 which in this case is soil located in the bottom section 12. The joint face 13 of the hollow boulder 16 is also shown for reference. Knock out plugs 25 are used to allow for drainage of water.

Other embodiments such as spherical shapes typical of "Utah Red-Rock" boulders, or trapezoidal shapes typical of "Canadian Rockies" boulders can also be depicted with like descriptions and reference numerals.

The hollow nature of the artificial landscaping boulders 10 of the present invention taken along Section 2—2 of FIG. 1 is shown in FIG. 2 with each section 11, 12 having wall 16 thickness equivalent to that required for structural stiffness such as 2–4 mm or an equivalent thereof.

In making or using the present invention, persons skilled in the art will appreciate that linear or cross-linked polymers, and ceramics, or combinations thereof, are the materials used to make the hollow artificial landscaping boulders. The boulders can be made in a variety of shapes (ellipsoidal, spherical, trapezoidal, irregular), and sizes. The methods of producing the artificial boulders in two or more pieces are: (1) polymer shaping processes using materials that are be laminated or coated with polymeric or ceramic materials, or combinations thereof, during processing to further simulate the appearance of natural rock boulders. The boulder are produced in halves or in several portions and subsequently joined; (2) ceramic casting or shaping processes; or (3) combinations of polymeric, ceramic, and natural fiber (paper, wood) mixtures using polymers, or ceramic/natural fibers coated with a thin (1 mm or less) ceramic slurry and granular coating to form the outer surface.

While the invention has been described in conjunction with embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the following claim.

What is claimed is:

1. An artificial landscaping boulder which simulates the appearance of a natural boulder comprising a hollow enclosure formed by upper and lower sections, wherein the upper and lower sections cooperate with one another to provide a friction fit, and wherein the boulder includes an integrally molded planting pocket extending inwardly from the exterior of the upper section and having a removable plug to allow for drainage of water.

* * * * *

UNITED STATES PATENT AND TRADEMARK OFFICE
CERTIFICATE OF CORRECTION

PATENT NO.    : 5,826,373
DATED         : October 27, 1998
INVENTOR(S)   : Frances D. Mrdjenovich It is certified that error appears in the above-identified patent and that said Letters Patent is hereby corrected as shown below:

On the title page, item [76], delete "Garden City" and insert --Brighton--.

Column 3, lines 12-31 should be deleted.

Signed and Sealed this

Second Day of February, 1999

Attest:

Attesting Officer

*Acting Commissioner of Patents and Trademarks*